United States Patent
Chen et al.

(10) Patent No.: US 9,467,959 B2
(45) Date of Patent: Oct. 11, 2016

(54) METHOD OF MAINTAINING MULTIPLE TIMING ADVANCE

(75) Inventors: Yih-Shen Chen, Hsinchu (TW); Per Johan Mikael Johansson, Kungsangen (SE); Chia-Chun Hsu, Taipei (TW); Pei-Kai Liao, Nantou County (TW); Shiang-Jiun Lin, Hsinchun (TW)

(73) Assignee: MEDIATEK, INC., Hsin-Chu (TW)

( * ) Notice: Subject to any disclaimer, the term of this patent is extended or adjusted under 35 U.S.C. 154(b) by 174 days.

(21) Appl. No.: 13/435,504

(22) Filed: Mar. 30, 2012

(65) Prior Publication Data

US 2012/0250520 A1    Oct. 4, 2012

Related U.S. Application Data

(60) Provisional application No. 61/470,687, filed on Apr. 1, 2011, provisional application No. 61/523,812, filed on Aug. 15, 2011.

(51) Int. Cl.
*H04W 56/00* (2009.01)
*H04L 5/00* (2006.01)
*H04W 28/06* (2009.01)

(52) U.S. Cl.
CPC .......... *H04W 56/0045* (2013.01); *H04L 5/001* (2013.01); *H04W 28/06* (2013.01)

(58) Field of Classification Search
CPC .. H04L 5/001; H04W 28/06; H04W 56/0045
USPC ........................................ 370/241, 329, 328
See application file for complete search history.

(56) References Cited

U.S. PATENT DOCUMENTS

| 8,537,739 B1* | 9/2013 | Dinan ........................... 370/312 |
| 2010/0085956 A1 | 4/2010 | Ahn et al. ..................... 370/344 |
| 2010/0195640 A1 | 8/2010 | Park et al. .................... 370/350 |
| 2010/0238908 A1 | 9/2010 | Wu ............................... 370/336 |
| 2011/0080896 A1* | 4/2011 | Krishnamurthy et al. ... 370/336 |

(Continued)

FOREIGN PATENT DOCUMENTS

| CN | 101841778 A | 9/2010 |
| TW | 201002117 A | 1/2010 |

(Continued)

OTHER PUBLICATIONS

EPO, Search Report for the EP patent application 12763712.2 dated Jul. 10, 2015 (9 pages).

(Continued)

*Primary Examiner* — Andrew Lai
*Assistant Examiner* — M Mostazir Rahman
(74) *Attorney, Agent, or Firm* — Imperium Patent Works; Zheng Jin

(57) ABSTRACT

A method of managing multiple timing advance (TA) groups, maintaining multiple TA timers, and performing UL synchronization in a multi-carrier wireless system is provided. When a new component carrier (CC) is configured, it is assigned to a TA group having a TA group identifier. The TA groups are managed statically or dynamically. The TA group identifier is used to uniquely identify the TA group in the operations of uplink (UL) timing synchronization. Multiple TA timers are assigned to multiple TA groups. The TA timers may have different values for different TA group. Different embodiments of UL timing adjustments for multiple TA groups are provided.

16 Claims, 9 Drawing Sheets

(56) References Cited

U.S. PATENT DOCUMENTS

| | | | |
|---|---|---|---|
| 2011/0103332 A1 | 5/2011 | Kuo | 370/329 |
| 2011/0110261 A1 | 5/2011 | Frenger | 370/252 |
| 2011/0134774 A1* | 6/2011 | Pelletier et al. | 370/252 |
| 2011/0158116 A1 | 6/2011 | Tenny et al. | 370/252 |
| 2011/0243102 A1* | 10/2011 | Sebire | H04W 56/0045 370/336 |
| 2012/0008600 A1* | 1/2012 | Marinier et al. | 370/336 |
| 2012/0014342 A1* | 1/2012 | Suzuki et al. | 370/329 |
| 2012/0115539 A1 | 5/2012 | Zhang et al. | 455/524 |
| 2012/0120821 A1* | 5/2012 | Kazmi et al. | 370/252 |
| 2012/0243514 A1* | 9/2012 | Wu | 370/336 |

FOREIGN PATENT DOCUMENTS

| | | |
|---|---|---|
| TW | 201110764 A | 3/2011 |
| WO | WO2011063244 | 5/2009 |
| WO | WO2010053334 | 5/2010 |
| WO | WO2010053334 A2 | 5/2010 |
| WO | WO2010069378 | 6/2010 |
| WO | WO2011085200 | 7/2011 |

OTHER PUBLICATIONS

JPO, Office Action for the JP patent application 2014-191356 dated Sep. 15, 2015 (18 pages).

R2-095815 3GPP TSG RAN WG2 Meeting #67bis; Huawei; Different Timing Advance Impact on Carrier Aggregation; Miyazaki, Japan dated Oct. 12-16, 2009 (3 pages).

3GPP TSG-RAN2#69 R2-101567, E-mail Rapporteur, CA Support for Multi-TA, San Francisco U.S.A. dated Feb. 22-26, 2010 (12 pages).

3GPP TSG-RAN #47 RP-100198, NTT Docomo, Inc. et al., Carrier Aggregation Deployment Scenario Requiring Multiple Timing Advance per UE, Vienna, Austria dated Mar. 16-19, 2010 (4 Pages).

EPO, Search Report for the EP patent application 12763712.2 dated Mar. 17, 2015 (5 pages).

Taiwan IPO, Office Action of the Taiwan patent application 101111278 dated Jun. 9, 2014 (10 pages).

* cited by examiner

METHOD OF MAINTAINING MULTIPLE TIMING ADVANCE

CROSS REFERENCE TO RELATED APPLICATIONS

This application claims priority under 35 U.S.C. §119 from U.S. Provisional Application No. 61/470,687, entitled "Methods of Maintaining Multiple Timing Advance," filed on Apr. 1, 2011; U.S. Provisional Application No. 61/523,812, entitled "Resource and Corresponding Response for Scell Timing Adjustment," filed on Aug. 15, 2011, the subject matter of which is incorporated herein by reference.

TECHNICAL FIELD

The disclosed embodiments relate generally to wireless communication systems, and, more particularly, to maintaining multiple timing advance and Scell timing adjustment.

BACKGROUND

A Long-Term Evolution (LTE) system offers high peak data rates, low latency, improved system capacity, and low operating cost resulting from simplified network architecture. LTE systems also provide seamless integration to older wireless network, such as GSM, CDMA and Universal Mobile Telecommunication System (UMTS). In LTE systems, an evolved universal terrestrial radio access network (E-UTRAN) includes a plurality of base stations, e.g., evolved Node-Bs (eNBs) communicating with a plurality of mobile stations referred as user equipments (UEs).

To establish initial connection with an eNB, a UE first measures downlink (DL) signals to obtain DL synchronization and then sends out a random access channel (RACH) preamble in the uplink (UL) direction. Upon receiving the RACH preamble, the eNB estimates the timing difference and sends back timing advance (TA) information in a random access response (RAR) message. The timing advance compensates for the propagation delay between the eNB and the UE and varies with time, due to UE mobility. During TA maintenance phase, the eNB measures the timing of the received UL data and adjusts the UL timing by TA command. The UE tracks the validity of its UL timing by means of a timing alignment timer (TA timer), which is started or restarted whenever a timing advance is received from the eNB.

Carrier aggregation (CA) is introduced to improve system throughput. With carrier aggregation, the LTE-Advance system can support peak target data rates in excess of 1 Gbps in the downlink (DL) and 500 Mbps in the uplink (UL). Such technology is attractive because it allows operators to aggregate several smaller contiguous or non-continuous component carriers (CC) to provide a larger system bandwidth, and provides backward compatibility by allowing legacy users to access the system by using one of the component carriers.

With Carrier aggregation, a single UE may be assigned radio resources on more than one CC. In some cases, multiple CCs share the same timing advance value and belong to the same timing advance group. In other cases, multiple CCs have different timing advance values and belong to different timing advance group. This is because the DL receptions of different CCs are from different propagation paths. If the time difference between the different paths is larger than a threshold, then the delay becomes non-negligible. As a result, multiple timing advance groups are required such that different timing advance values are applied to different CCs to avoid inter-symbol interference. In one example, the need for different timing advance may arise due to inter-band carrier aggregation, or when transmission for one band is routed via a frequency selective repeater while transmission for another band is not. In another example, DL signals of different bands are routed through different source nodes (e.g., remote radio heads) located some distance apart.

Due to the existence of multiple timing advance groups in a single UE, a comprehensive solution for managing timing advance groups, for maintaining TA timers, and for performing UL synchronization via timing reference signals over different CCs is desired.

SUMMARY

A method of managing multiple timing advance (TA) groups, maintaining multiple TA timers, and performing UL synchronization in a multi-carrier wireless system is provided.

In a first novel aspect, each newly configured secondary cell (SCELL) of a UE is assigned to a TA group having a TA group identifier by an eNB. The TA groups are managed statically or dynamically. In static grouping, the eNB pre-defines the TA group and assigns the group index during SCELL configuration. In dynamic grouping, the eNB uses the UL timing information, derived from UL timing reference signal, to determine the TA group and assigns/reassigns the TA group index after the SCELL configuration. The TA group index is used to uniquely identify the TA group in the operations of uplink timing synchronization via RRC and/or MAC layer configuration.

In a second novel aspect, multiple TA timers are assigned to multiple TA groups. The TA timers may have different values based on the cell coverage of each TA group. In one embodiment, the TA timer value is set to infinity, and the TA timer does not expire when the SCELL has very small cell coverage. In another embodiment, when the SCELL is deactivated, the TA timer continues to countdown. If the SCELL is re-activated before timer expiry, then the UE can assume that the UL is synchronized for the TA group.

In a third novel aspect, UL timing adjustment procedures for synchronization over the SCELL are provided. In one embodiment, the UE is refrained from sending parallel RACHs simultaneously. In other embodiments, the UE performs SCELL random access channel (RACH) or aperiodic sounding reference signal (ap-SRS) procedure to avoid code confusion problem.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
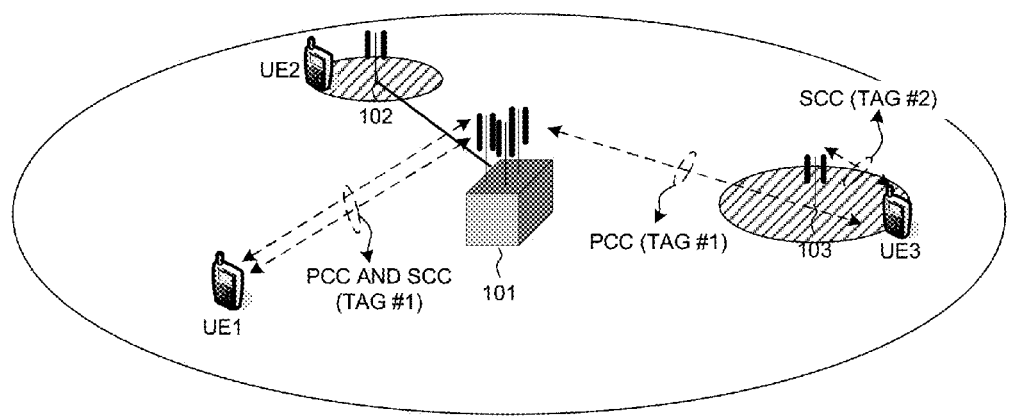
FIG. 1 illustrates a method of managing multiple timing advance groups in a wireless system in accordance with one novel aspect.

FIG. 1 illustrates a method of managing multiple timing advance (TA) groups in a multi-carrier wireless communication system 100 in accordance with one novel aspect. Wireless communication system 100 comprises a main base station eNB 101, a remote radio head RRH 102, a frequency selective repeater 103, a first user equipment UE1, a second UE2, and a third UE3. The communication system supports multiple component carriers over different frequency channels. For uplink (UL) synchronization between a UE and its base station with respect to each component carrier (CC), the UE receives an UL timing advance from the eNB, which compensates for the propagation delay between the eNB and the UE. For multiple configured CCs, some CCs may share the same timing advance with some offset tolerance, while other CCs must have their own timing advance when the offset becomes non-negligible. As a result, multiple timing advance groups are required such that different timing advance values are applied to different CCs to avoid inter-symbol interference. One timing advance group (TA group) refers to a group of DL/UL CCs having the same or similar UL timing advance value. The UE could derive DL timing from any of the DL CCs, and use the same UL timing (e.g., by adding the timing advance value to the DL timing) for all the UL transmission. Depending on the offset tolerance, a timing group might include CCs that share a common controlling site, or only of CCs whose antennas are collocated.

In one novel aspect, each newly configured CC will be assigned to a TA group having a group identifier with respect to each UE. Each TA group is statically or dynamically grouped by eNB, and the corresponding TA group index is configured or reconfigured by eNB via radio resource control (RRC) or media access control (MAC) message. In the example of FIG. 1, UE1, UE2 and UE3 all support multiple CCs (e.g., a primary component carrier PCC and a secondary component carrier SCC). In one embodiment, eNB 101 can statically define the TA groups and assign the group index during SCC configuration. For example, for UE1, PCC and SCC are statically assigned to the same TA group having group identifier #1, because the DL signals for PCC and SCC are transmitted from the same source node. Similarly, for UE2, CCs from eNB 101 are statically assigned to a first TA group #1, while CCs from RRH 102 are statically assigned to a second TA group #2, because the DL signals for the different carriers are transmitted from different source nodes and the arrival times are priori known to be different.

In another embodiment, TA groups are dynamically assigned based on the actual timing advance value of each CC. For example, for UE3, if SCC is covered by frequency selective repeater 103, then PCC is assigned to a first TA group #1 while SCC is assigned to a second TA group #2. This is because the DL signals for PCC and SCC are propagated from different path and experience different fading although the DL signals are transmitted from the same source node. The benefit of introducing a TA group identifier is that it can simply be used both in RRC layer and in MAC layer to uniquely identify the TA group in the operations of multi-carrier UL timing management. In the absence of a TA group identifier, per-group TA management would become complicated from protocol signaling point of view.

Figure 2:
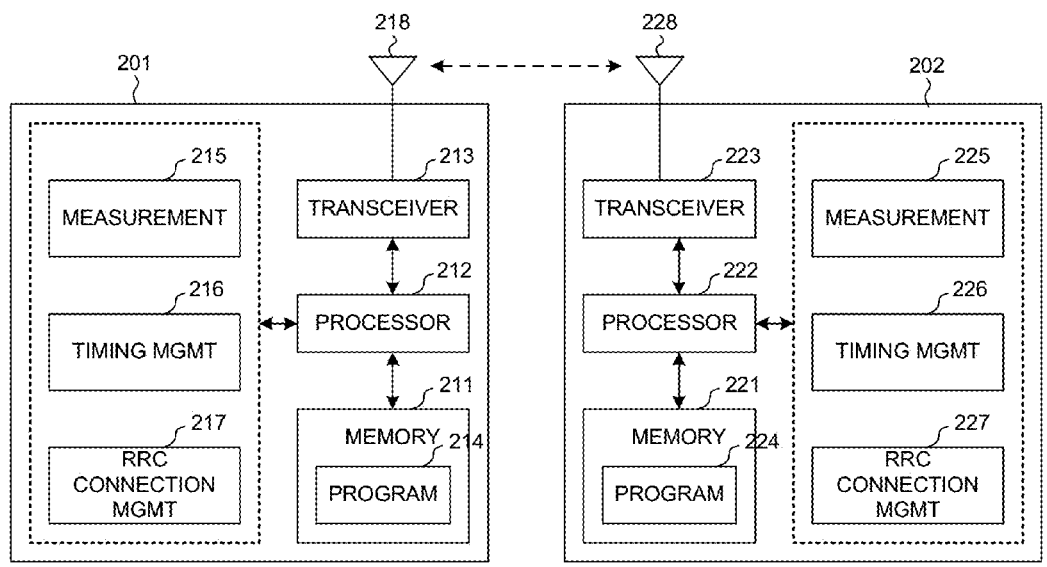
FIG. 2 is a simplified block diagram of a UE and an eNB in accordance with one novel aspect.

FIG. 2 is a simplified block diagram of a user equipment UE 201 and a base station eNB 202 in accordance with one novel aspect. UE 201 comprises memory 211, a processor 212, a transceiver 213 coupled to an antenna 218. UE 201 also comprises various function modules including a measurement module 215 that performs radio signal measurements, a timing management module 216 that manages downlink and uplink synchronization and timing, and an RRC connection management module 217 that performs carrier configuration and connection setup procedures. Similarly, eNB 202 comprises memory 221, a processor 222, a transceiver 223 coupled to an antenna 228. eNB 202 also comprises various function modules including a measurement module 225 that performs radio signal measurements, a timing management module 226 that manages downlink and uplink synchronization and timing, and an RRC connection management module 227 that performs carrier configuration and connection setup procedures. The different modules are function modules that can be implemented by software, firmware, hardware, or any combination thereof. The function modules, when executed by the processors (e.g., via executing program codes 214 and 224), allow UE 201 and eNB 202 to manage multiple TA groups, maintain TA timers, and handle timing adjustments.

Figure 3:
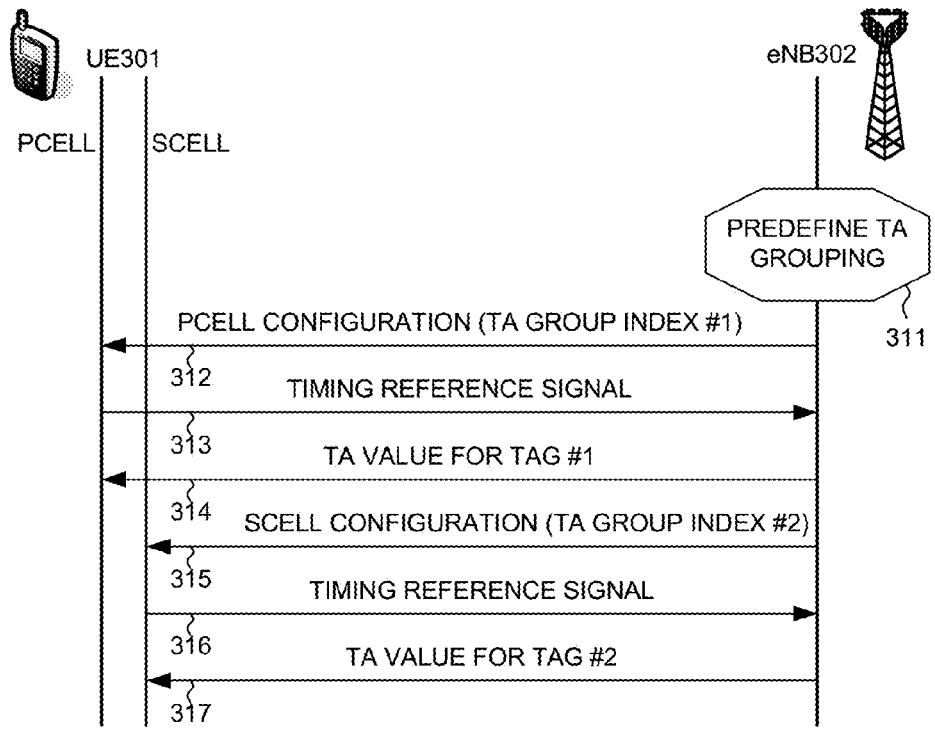
FIG. 3 illustrates static grouping for managing multiple timing advance groups.

FIG. 3 illustrates static TA grouping for managing multiple TA groups. In the example of FIG. 3, eNB302 pre-defines a first TA group #1 for PCELL and a second TA group 32 for SCELL (step 311). In step 312, eNB 302 configures PCELL for UE 301 and assigns the PCELL to TA group #1 during configuration. In step 313, UE 301 sends a timing reference signal to eNB 302 over PCELL. In response, eNB 302 measures the timing of the reference signal and sends a first timing advance value to UE 301 in step 314. Later, eNB 302 configures SCELL for UE 301 and assigns the SCELL to TA group #2 during configuration (step 315). In step 316, UE 301 transmits a timing reference signal to eNB 302 over SCELL. In response, eNB 302 measures the timing the reference signal and sends a second timing advance value to UE 301 (step 317). The benefit of determining TA groups statically is simplicity. Each newly configured SCELL will be assigned to a pre-defined TA group with a pre-defined group index.

Figure 4:
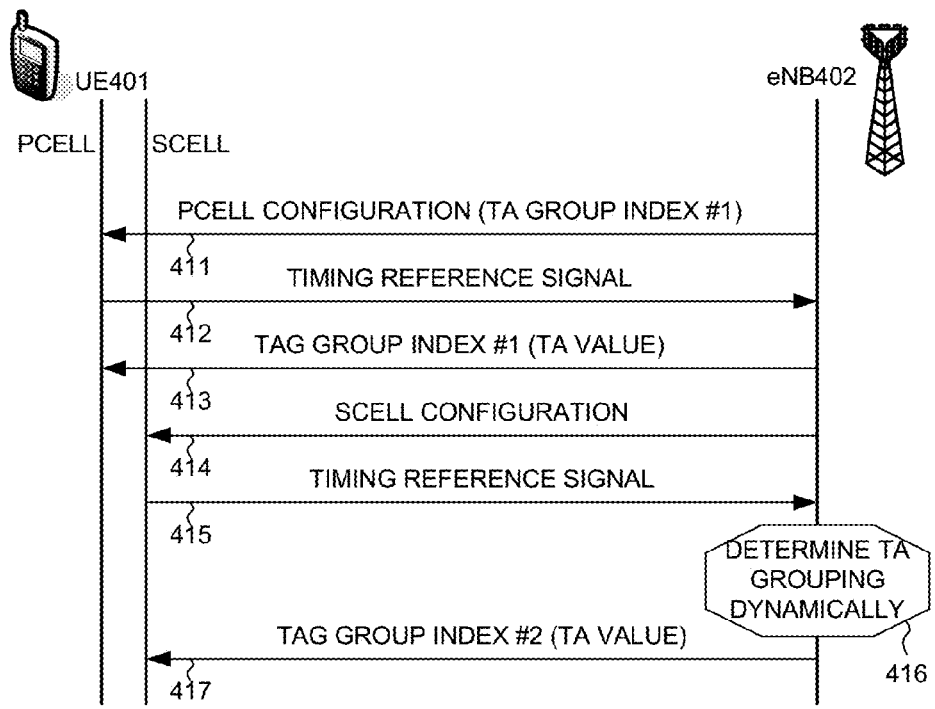
FIG. 4 illustrates dynamic grouping for managing multiple timing advance groups.

FIG. 4 illustrates dynamic grouping for managing multiple TA groups. In step 411, eNB 402 configures a PCELL for UE 401 and assigns the PCELL to TA group #1 during configuration. In step 412, UE 401 sends a timing reference signal to eNB 402 over PCELL. In response, eNB 402 measures the timing of the reference signal and sends a first timing advance value to UE 401 in step 413. Later, eNB 402 configures SCELL for UE 401 without any TA group assignment (step 414). In step 415, UE 401 transmits a timing reference signal to eNB 402 over SCELL. In response, eNB 402 measures the timing the reference signal and estimates a second timing advance value (step 416). In step 416, eNB 402 also determines the TA group assignment for SCELL based on the estimated timing advance value. For example, if the second timing advance value is much different (e.g., SCELL is routed through a repeater) from the first timing advance value, then the SCELL is assigned to TA group #2. In step 417, eNB 402 configures the TA group index and its timing advance for the SCELL via an RRC or MAC message. The benefit of determining TA groups dynamically based on measurements becomes obvious in the repeater scenarios. Since the majority of UEs can use a single TA group, and only a few UEs are covered by frequency selective repeaters, dynamically assigning TA groups reduces the signaling overhead to maintain multiple TA groups for all UEs.

Once a UE has obtained initial UL synchronization and the UE is configured with a corresponding TA group for each configured CC, the UE needs to maintain its UL synchronization over time. First, UL timing can be restored when an eNB thinks a UE is out of its UL timing. For example, the eNB measures the timing of received UL data of a specific carrier and adjusts the UL timing by a TA command containing an updated timing advance via a MAC CE. The MAC CE also contains the TA group index to uniquely identify the TA group for that specific carrier. The UE then applies the same updated timing advance for all carriers that belong to the same TA group. Second, UL timing can be restored when the timing advance value is no longer valid due to expiration of an associated TA timer. For example, upon the expiration of the TA timer, the eNB can trigger the UE to send a timing reference signal and adjust its UL timing accordingly.

Figure 5:
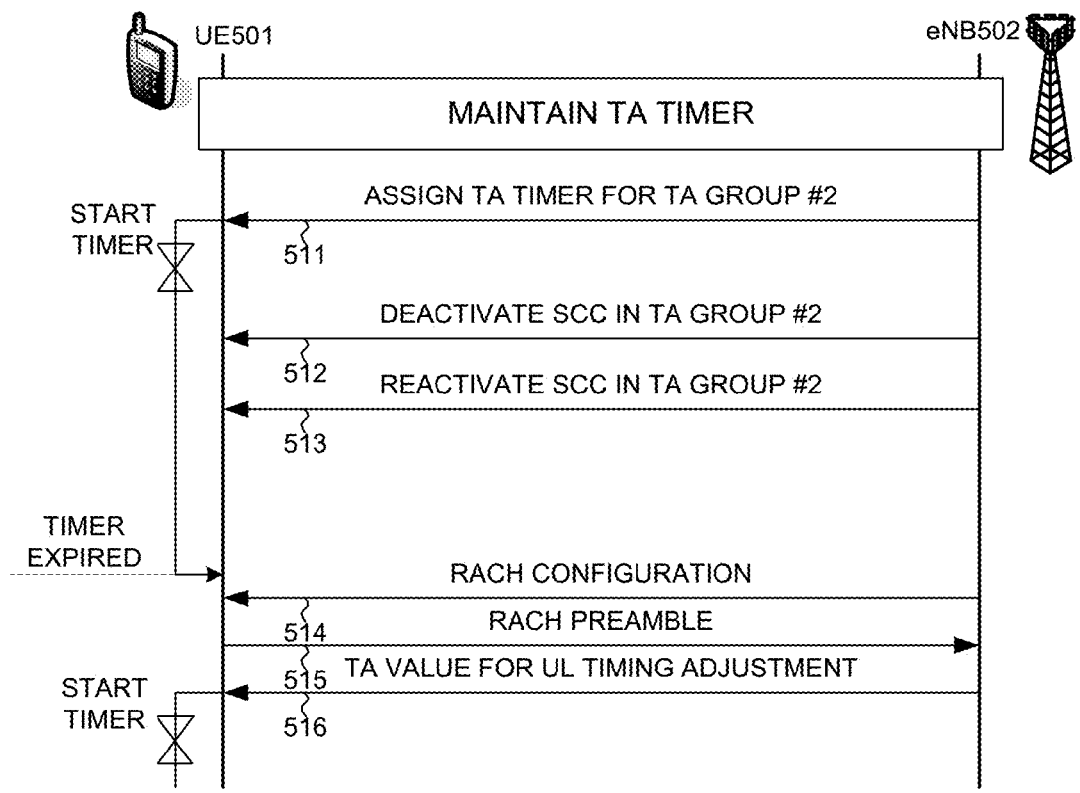
FIG. 5 illustrates managing and maintaining TA timers for multiple timing advance groups.

FIG. 5 illustrates a method of managing and maintaining TA timers for multiple TA groups. Each TA group is assigned with a TA timer, and each TA timer is started or restarted when its timing advance is newly adjusted in the corresponding TA group. When the TA timer is running, the TA group is in a "SYNC" status. When the TA timer is expired, the TA group is in an "UNSYNC" status. In one advantageous aspect, different TA timers are configured for different TA groups to more efficiently adjust UL timing. If the cell coverage of cells in a TA group is large, then its TA timer is configured with a small value so that UL timing is adjusted more frequently. On the other hand, if the cell coverage of cells in a TA group is small, then its TA timer is configured with a large value so that UL timing is adjusted less frequently. For example, RRH cell may be very small, and may not even need TA maintenance at all. As a result, the TA timer is configured to be infinity for the TA group served by the RRH, effectively disabling TA maintenance and avoiding the associated overhead.

In another advantageous aspect, the TA timer continues to count down when all the SCELLs in the same TA group are deactivated. In the example of FIG. 5, UE 501 is configured with a TA group #2 having one or more SCELLs. In step 511, TA group #2 is assigned with TA timer by eNB 502 via an RRC or MAC CE message. UE 501 starts the TA timer accordingly. In step 512, all the SCELLs in the TA group are deactivated. UE 501 continues to count down the TA timer.

In step 513, one of the SCCs is reactivated. UE 501 assumes that the UL is still synchronized for TA group #2 if any one of the SCCs is re-activated before the TA timer expiration. The benefit for this approach is that no TA adjustment is needed when an SCELL is re-activated again soon, which is critical to frequent activation and deactivation operation.

Upon the TA timer expiration, eNB 502 may trigger a RACH procedure so that UE 501 can send a timing reference signal to eNB 502 for TA adjustment. Alternatively, UE 501 may autonomously send a timing reference signal to eNB 502. In the example of FIG. 5, UE 501 receives a RACH assignment message from eNB 502 (step 514). In step 515, UE 501 sends a RACH preamble to eNB 502. In step 516, eNB 502 measures the RACH preamble and sends a timing advance value back to UE 501. If UE 501 has multiple TA groups, then in some scenarios, the multiple TA timers may expire at the same time, or eNB 502 may command UE 501 to send RACH preamble over multiple configured CCs simultaneously. In one advantageous aspect, UE 501 is refrained from sending parallel RACH preambles simultaneously to avoid power outage in the uplink (e.g., cell edge case). This is because RACH procedure applies open loop power control and is very power consuming. Therefore, if the eNB commands the UE to send RACH over PCELL, then the UE suspends the RACH over SCELLs. In one embodiment of receiving RACH command for a SCELL with on-going RACH procedure, the UE aborts the on-going RACH procedure and initiates a new RACH procedure. If more than one TA timers expire, then the UE transmits timing reference signals one by one. The decision can be implemented by UE internal scheduling or internal priorities over the SCELLs. Furthermore, the UE can also transmit RACH according to a RACH mask index, which contributes to different RACH transmission timing. The RACH mask index can be configured for each TA group and obtained from PDCCH.

Figure 6:
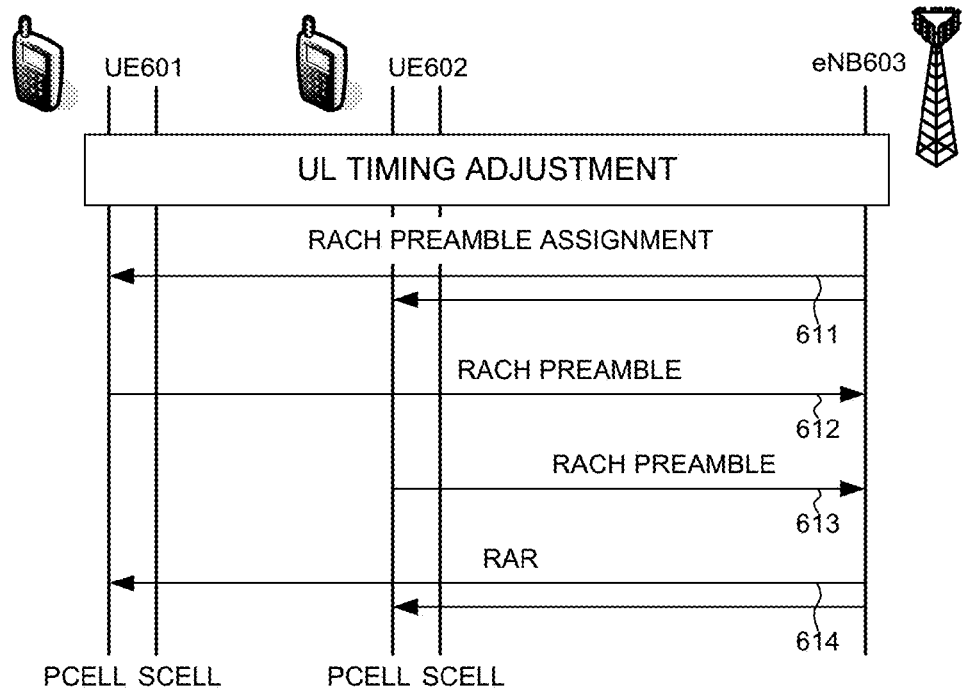
FIG. 6 illustrates UL timing adjustments for multiple timing advance groups.

FIG. 6 illustrates UL timing adjustments for multiple TA groups in a wireless communication system 600. Wireless communication system 600 comprises a first UE 601, a second UE 602 and a base station eNB 603. For UL timing adjustment, eNB 603 may simply measure the timing from received UL data and then estimates the timing difference and sends out TA command for timing adjustment. The different timing advance values may be aggregated in one TA command via a new MAC CE format to adjust all the UL timings for different TA groups and for different UEs. If eNB 603 receives timing reference signals such as RACH preambles from the UEs, then eNB 603 can send out random access response (RAR) for timing adjustment. In the example of FIG. 6, eNB 603 first transmits an RA preamble assignment for RACH resource configuration to UE 601 and UE 602 (step 611). If contention-based SCELL RACH is supported, then the configuration may be provided via dedicated signaling (e.g., RRCConnectionReconfiguration). Alternatively, UE 601 can obtain RACH configuration information by reading the BCCH of PCELL as well as SCELL. In step 612, eNB 603 receives a RACH preamble from UE 601, and in step 613, eNB 603 receives another RACH preamble from UE 602. Based on the timing measurements, eNB 603 sends out timing advance values via RAR to UE 601 and UE 602 for timing adjustment (step 614).

Because UE 601 and UE 602 both support multiple CCs (e.g., PCELL and SCELL) belonging to multiple TA groups, the UL synchronization needs to support RACH over both PCELL and SCELL. In LTE Rel-10, UE only monitors common search space in PCELL for PDCCH indicating RAR. In LTE Rel-11, there could be "code" confusion"

problem if UE1 and UE2 both send out the same RACH preamble in the same RACH resource (e.g., transmission opportunity) of different component carriers. This is because the physical downlink control channel (PDCCH) indicating the RAR is scrambled by a random access radio network temporary identifier (RA-RNTI), which is based on the parameters of RACH transmission opportunity. The information of component carrier is not used for calculating RA-RNTI. As a result, although the transmitted RACH preambles do not collide physically, there is no way for the two UEs to distinguish the PDCCH indicating the RAR.

For non-contention-based SCELL RACH, one solution is that the eNB carefully assign RACH resource to UE and make sure that a specific preamble code is only simultaneously used by one UE among all CCs. This solution relies on preamble coordination. This solution can be implemented when all the CCs are controlled by a single eNB. The eNB coordinates the RACH preamble codes among CCs. For inter-eNB aggregation scenario, additional coordination efforts are needed. In one embodiment of inter-eNB aggregation scenario, the preamble coordination takes places over X2 interface between eNBs. In another embodiment of inter-eNB aggregation scenario, the preamble coordination takes places in mobility management entity (MME). Note that, the preamble coordination solution can also be applied for the contention-based SCELL RACH. In one embodiment, the preamble codes are partitioned among CCs so that there is no code confusion problem even if UEs randomly select preamble codes.

For contention-based SCELL RACH, different solutions are possible. Different embodiments of how RACH procedures are performed over both PCELL and SCELL for UL synchronization are now described below with additional details. In the following examples of FIGS. 7-9, UE1 has a first ID of cell radio network temporary identifier (CRNTI1), while UE2 has a second ID of CRNTI2. UE1 and UE2 both are configured with a PCELL and an SCELL, and each belongs to a different TA group for UL synchronization.

Figure 7:
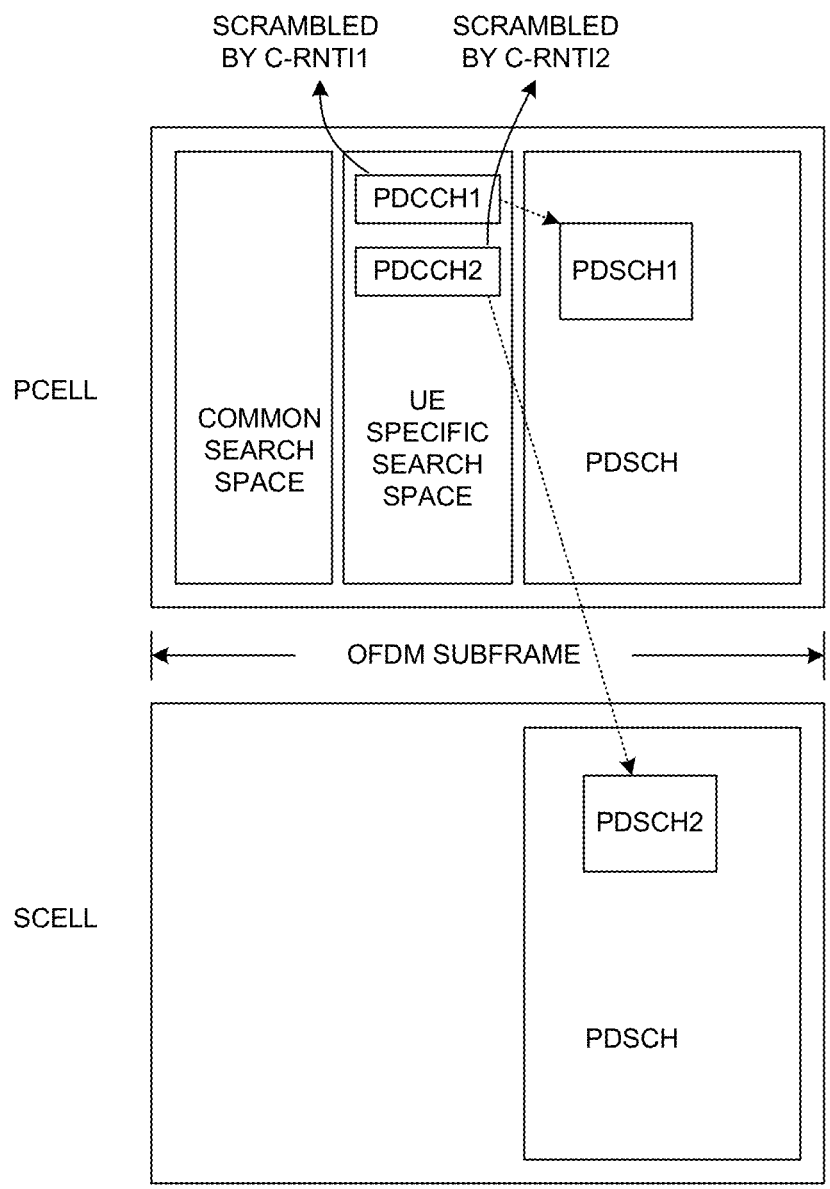
FIG. 7 illustrates a first embodiment of SCELL RACH for UL synchronization.

FIG. 7 illustrates a first embodiment of SCELL RACH for UL synchronization. In the example of FIG. 7, UE1 transmits a RACH preamble in a RACH resource over PCELL, while UE2 transmits the same RACH preamble in the same RACH resource over SCELL. If the UEs only monitor common search space in PCELL for PDCCH indicating RAR, then there will be "code confusion". In one novel aspect, the PDCCH indicating the SCELL RAR is transmitted in the UE specific search space over PCELL, and the corresponding physical downlink shared channel (PDSCH) carrying the SCELL RAR data is transmitted onto the concerned SCELL. More specifically, the PDCCH for both PCELL and SCELL RAR is scrambled by C-RNTI. As illustrated in FIG. 7, PDCCH1 indicates the RAR for UE1 while PDCCH2 indicates the RAR for UE2. Both PDCCH1 and PDCCH2 are located in the UE-specific search space of the PCELL, and PDCCH1 is scrambled by CRNTI1 while PDCCH2 is scrambled by CRNTI2. For UE1, it monitors the UE-specific search space and finds PDCCH1, which points to the location of PDSCH1 that contains the RAR data for PCELL. For UE2, it monitors the UE-specific search space and finds PDCCH2, which points to the location of PDSCH2 that contains the RAR data for SCELL with cross-carrier scheduling.

By using CRNTI, the code confusion problem does not happen because each UE has its own unique CRNTI. In addition, when transmitting the PDSCH onto the concerned SCELL, no new DCI format is needed. Another alternative is to transmit the PDSCH over the PCELL. However, new DCI format is needed. The RACH resource configuration restriction can be relaxed, because eNB no longer needs to worry about the possible code confusion problem.

Figure 8:
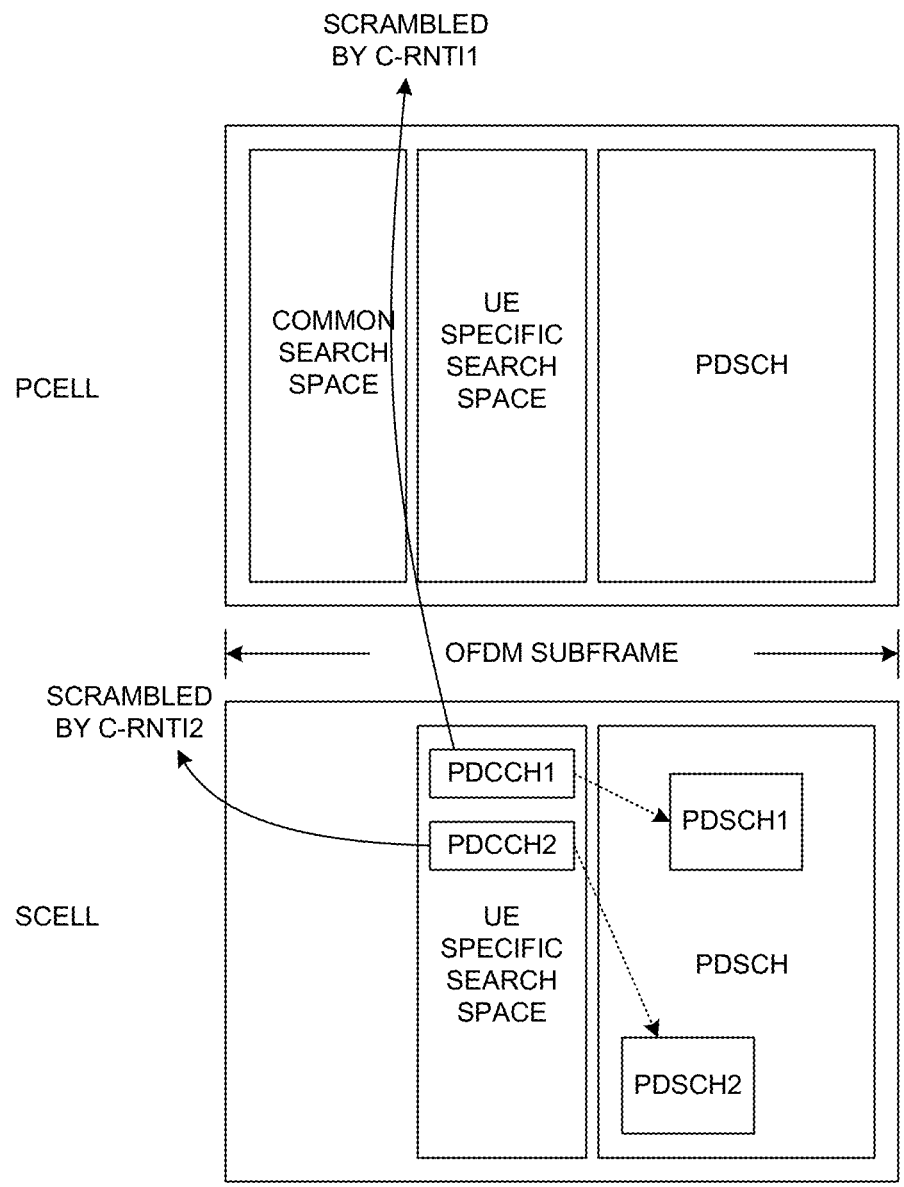
FIG. 8 illustrates a second embodiment of SCELL RACH for UL synchronization.

FIG. 8 illustrates a second embodiment of SCELL RACH for UL synchronization. In the example of FIG. 8, UE1 transmits a RACH preamble in a RACH resource over SCELL, while UE2 transmits the same RACH preamble in the same RACH resource also over SCELL. Similar to FIG. 7, to avoid both code collision and code confusion problem, the UE monitors the UE-specific search space to find the PDCCH indicating the SCELL RAR. Unlike FIG. 7, however, the PDCCH indicating the SCELL RAR is transmitted over the concerned SCELL. No cross-carrier scheduling is supported under this approach. As illustrated in FIG. 8, PDCCH1 indicates the RAR for UE1 while PDCCH2 indicates the RAR for UE2. Both PDCCH1 and PDCCH2 are located in the UE-specific search space of the concerned SCELL, and PDCCH1 is scrambled by CRNTI1 while PDCCH2 is scrambled by CRNTI2. For UE1, it monitors the UE-specific search space and finds PDCCH1, which points to the location of PDSCH1 that contains the RAR data for the concerned SCELL. For UE2, it monitors the UE-specific search space and finds PDCCH2, which points to the location of PDSCH2 that contains the RAR data for the concerned SCELL.

Figure 9:
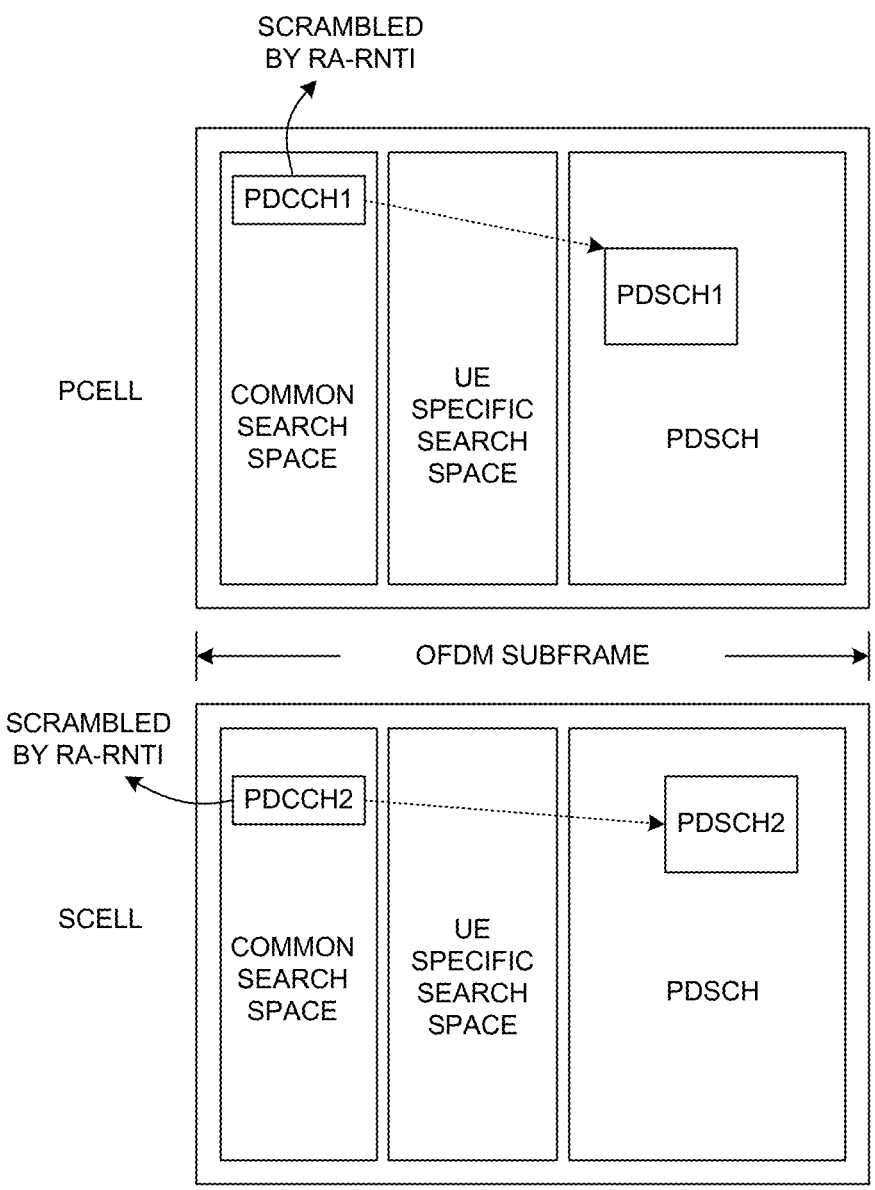
FIG. 9 illustrates a third embodiment of SCELL RACH for UL synchronization.

FIG. 9 illustrates a third embodiment of SCELL RACH for UL synchronization. In the example of FIG. 9, UE1 transmits a RACH preamble in a RACH resource over PCELL, while UE2 transmits the same RACH preamble in the same RACH resource over SCELL. To avoid code confusion, PDCCH and PDSCH for SCELL RAR are both transmitted over the concerned SCELL. As illustrated in FIG. 9, PDCCH1 indicates the RAR for UE1 while PDCCH2 indicates the RAR for UE2. PDCCH1 is scrambled by RA-RNTI and is located in the common search space of the PCELL. PDCCH2 is scrambled by the same RA-RNTI and is located in the common search space of the SCELL. For UE1, it monitors the common specific search space and finds PDCCH1, which points to the location of PDSCH1 that contains the RAR data for PCELL. For UE2, it monitors the common search space and finds PDCCH2, which points to the location of PDSCH2 that contains the RAR data for SCELL. Under this approach, a new UE behavior is required because UE needs to monitor the common search space of SCELL.

Figure 10:
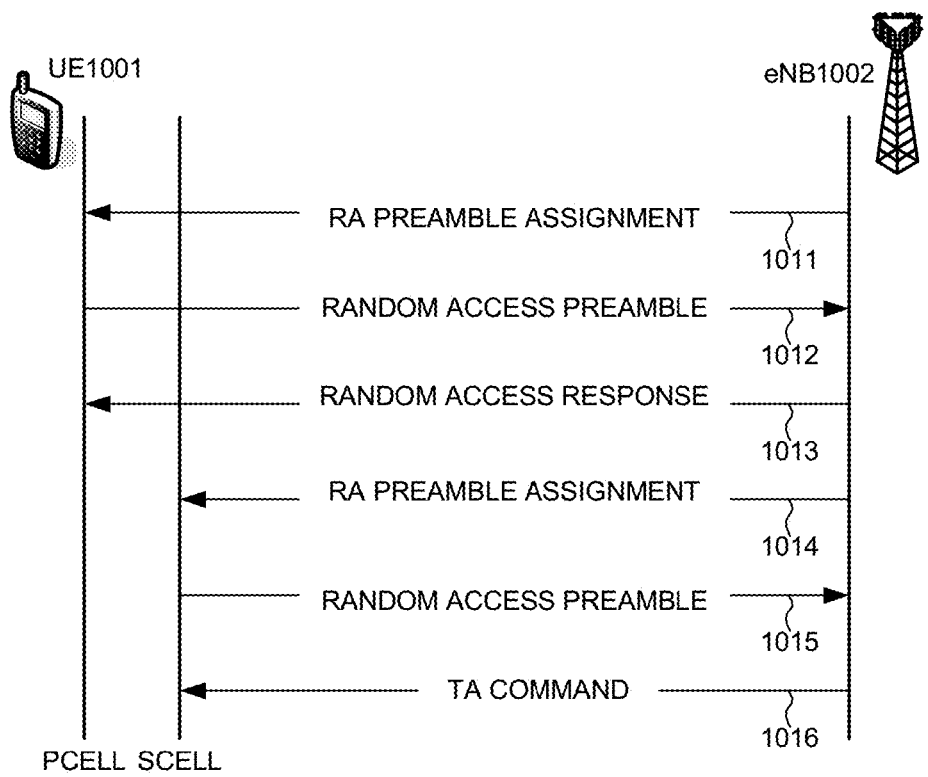
FIG. 10 illustrates a fourth embodiment of UL synchronization over SCELL.

FIG. 10 illustrates a fourth embodiment of UL synchronization over SCELL. Instead of sending the timing advance value via RAR for SCELL, eNB can send a TA command via a MAC CE. In the example of FIG. 10, for PCELL, eNB 1002 first send an RACH preamble assignment for PCELL to UE 1001 (step 1011). In step 1012, UE 1001 sends a RACH preamble to eNB 1002 over PCELL. In step 1013, eNB 1002 sends UE 1001 an RAR for UL timing adjustment. On the other hand, for SCELL, eNB 1002 first send an RACH preamble assignment for SCELL to UE 1001 (step 1014). In step 1015, UE 1001 sends a preamble to eNB 1002 over SCELL. In step 1016, eNB 1002 sends UE 1001 a TA command via a MAC CE for UL timing adjustment. For MAC CE, the PDCCH indicating the TA command is scrambled by C-RNTI and is transmitted over UE-specific search space. Note that the TA command MAC CE can be transmitted either over PCELL (cross-carrier scheduling) or over SCELL (non-cross-carrier scheduling). Because the UE only waits for TA command, there is no need for contention resolution. The TA command MAC CE in Rel-10 only contains 7 bits for timing adjustment. Contrarily, the RAR contains 15 bits for timing adjustment. In one embodiment, an extended TA command MAC CE is designed to provide wider range of timing adjustment. The adjustment range provided by the extended TA command MAC CE is comparable with that by RAR.

For the code confusion problem, one solution is to redefine the parameters used in Rel-10 RACH procedure. One novel embodiment of redefining the parameters of Rel-10 RACH procedure is to distinguish UEs by redefining a "Temporary RNTI" field in the RAR by filling with UE's C-RNTI. The embodiment is based on an assumption that UE should hold a valid C-RNTI. before initiating Scell RACH procedure. The consequent UE impact is that UE shall check the "Temporary RNTI" field in RAR after sending Scell RACH. Another novel embodiment of redefining the parameters of Rel-10 RACH procedure is to redefine the RA-RNTI field by introducing carrier-specific offset. That is, the redefined RA-RNTI is a function of carrier-specific offset and RACH resource. With proper assignment of carrier-specific offset, UEs that transmit RACH preambles in the same RACH resource of different carriers can be distinguished with unique RA-RNTI.

Figure 11:
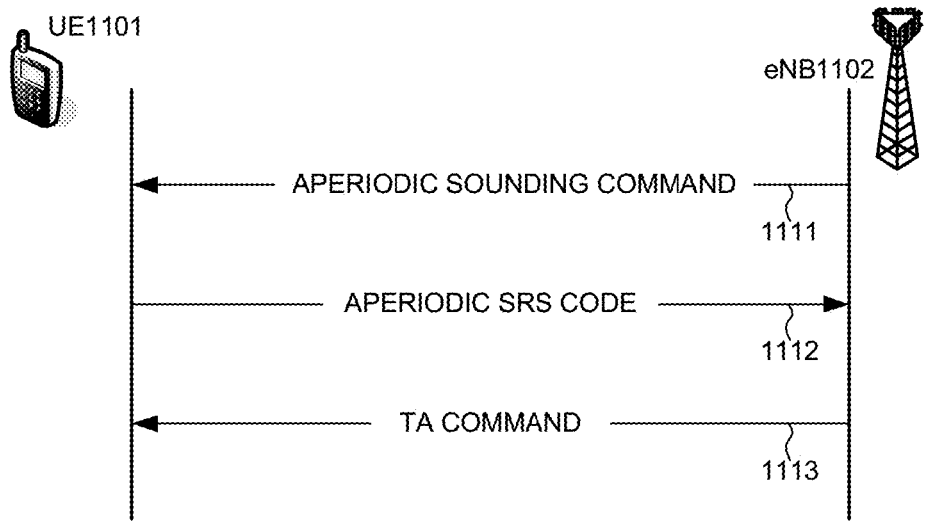
FIG. 11 illustrates a fifth embodiment of UL synchronization over SCELL.

FIG. 11 illustrates a fifth embodiment of UL synchronization over SCELL. In addition to SCELL RACH, aperiodic sounding reference signal (ap-SRS) can also be used as a timing reference signal over SCELL. In the example of FIG. 11, in step 1111, eNB 1102 sends an aperiodic SRS command to UE 1101. In step 1112, UE 1101 sends an aperiodic SRS code to eNB 1102. In step 1113, eNB 1102 measures the timing of the aperiodic SRS and sends a TA command via a MAC CE for UL timing adjustment. Similar to FIG. 10, the response message for TA command can be scrambled by C-RNTI.

Figure 12:
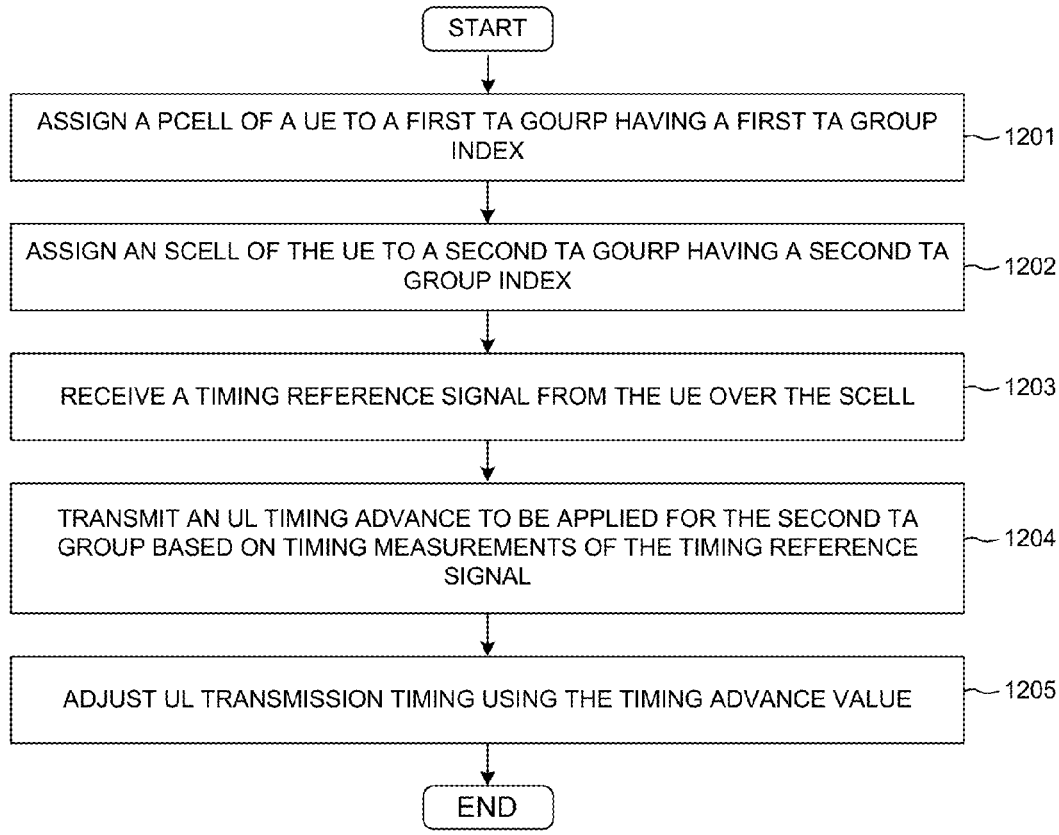
FIG. 12 is a flow chart of a method of managing multiple TA groups in accordance with one novel aspect.

FIG. 12 is a flow chart of a method of managing multiple TA groups in accordance with one novel aspect. In step 1201, an eNB configures a PCELL of a UE and assigns the PCELL to a first TA group having a first TA group index. In step 1202, the eNB configures an SCELL of the UE and assigns the SCELL to a second TA group having a second TA group index. In step 1203, the eNB receives a timing reference signal transmitted from the UE over the SCELL. In step 1204, the eNB transmits an UL timing advance to be applied for the second TA group based on timing measurements of the timing reference signal. In step 1205, The UE adjusts its UL transmission timing using the received timing advance value.

Figure 13:
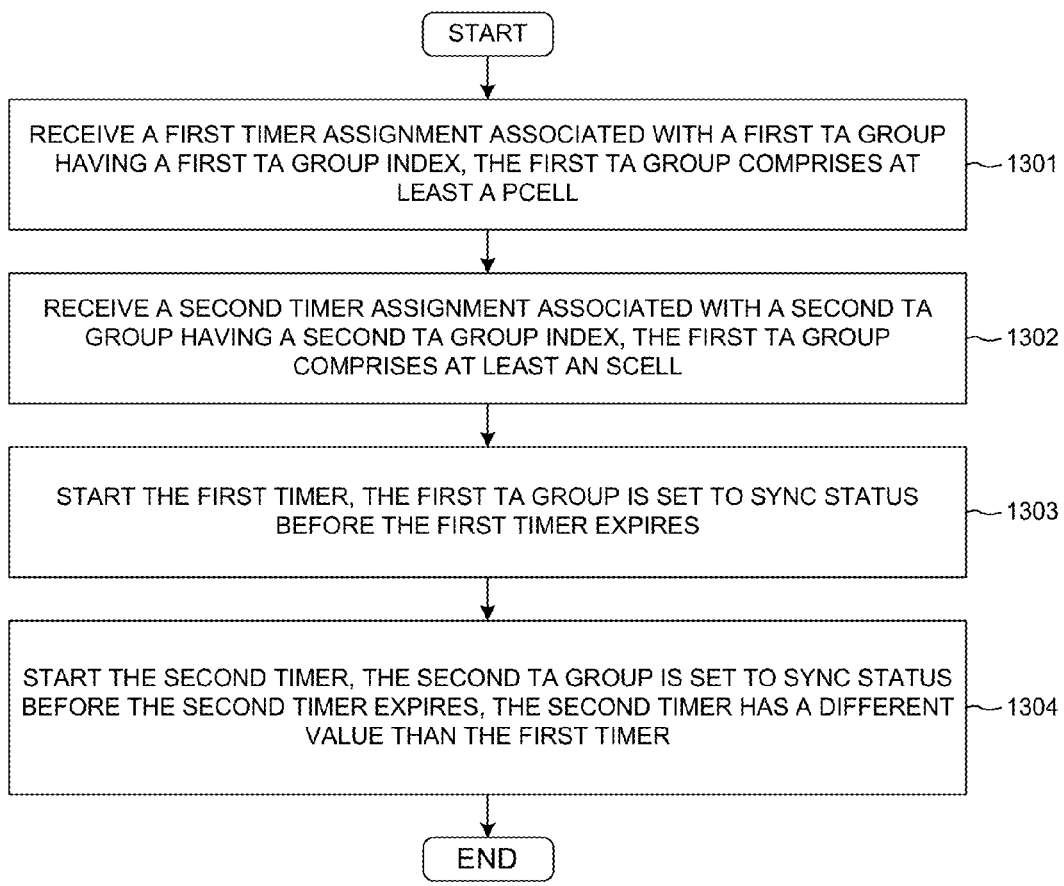
FIG. 13 is a flow chart of a method of maintaining TA timers for multiple TA groups in accordance with one novel aspect.

FIG. 13 is a flow chart of a method of managing and maintaining TA timers for multiple TA groups in accordance with one novel aspect. In step 1301, a UE receives a first timer assignment associated with a first timing advance (TA) group having a first TA group index, wherein the first TA group comprises at least one primary cell (PCELL) of the UE. In step 1302, the UE receives a second timer assignment associated with a second TA group having a second TA group index, wherein the second TA group comprises at least one secondary cell (SCELL) of the UE. In step 1303, the UE starts the first timer and sets the first TA group to SYNC status. In step 1304, the UE starts the second timer and set the second TA group to SYNC status. The second timer has a larger value than the first timer if the SCELL has a smaller cell coverage than the PCELL. If the SCELL has a very small coverage, then the second timer does not expire. When the SCELL is deactivated, the second timer keeps counting down and the second TA group keeps SYNC status. Note that the proposed solutions for contention-based SCELL RACH can also be applied in non-contention-based SCELL RACH.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method for managing and maintaining timing advance in a multi-carrier wireless communication network, the method comprising:
  assigning a primary cell (PCELL) of a user equipment (UE) to a first timing advance (TA) group, wherein the first TA group is associated with a first TA group index and a first uplink timing advance;
  assigning a secondary cell (SCELL) of the UE to a second TA group, wherein the second TA group is associated with a second TA group index and a second uplink timing advance;
  receiving a timing reference signal from the UE over the SCELL;
  transmitting the second uplink timing advance to be applied for the second TA group based on timing measurements of the timing reference signal; and
  providing the first TA group with a first TA timer value and providing the second TA group with a second TA timer value, wherein the first TA timer value and the second TA timer value are configured based on a cell coverage size of the PCELL and the SCELL respectively, and wherein the second TA timer has a larger value than the first TA timer if the SCELL has a smaller cell coverage size than the PCELL.

2. The method of claim 1, wherein the timing reference signal is a random access channel (RACH) preamble code, wherein the timing advance is transmitted via a random access response (RAR) message indicated by a physical downlink control channel (PDCCH), and wherein the PDCCH is scrambled by a cell radio network temporary identifier (C-RNTI) and transmitted over the PCELL or the SCELL.

3. The method of claim 1, wherein the timing reference signal is a random access channel (RACH) preamble code, wherein the timing advance is transmitted via a random access response (RAR) message indicated by a physical downlink control channel (PDCCH), and wherein the PDCCH is scrambled by a random access response radio network temporary identifier (RA-RNTI) and transmitted over the SCELL.

4. The method of claim 1, wherein the timing reference signal is a random access channel (RACH) preamble code, wherein the timing advance is transmitted via a random access response (RAR) message indicated by a physical downlink control channel (PDCCH), and wherein the PDCCH is scrambled by a random access response radio network temporary identifier (RA-RNTI) with a carrier-specific offset and transmitted over the PCELL.

5. The method of claim 1, wherein the timing reference signal is a random access channel (RACH) preamble code, and wherein the timing advance is contained in a media access control (MAC) control element (CE).

6. The method of claim 1, wherein the timing reference signal is a sounding reference signal (SRS), and wherein the timing advance is contained in a media access control (MAC) control element (CE).

7. The method of claim 1, further comprising:
measuring uplink data over the SCELL; and
transmitting an updated uplink timing advance for the second TA group via a media access control (MAC) control element (CE) containing the second TA group index.

8. The method of claim 1, wherein the second TA timer value is set to infinity if the SCELL is a Remote Radio Header (RRH) cell, and wherein the second TA timer does not expire.

9. A method, comprising:
configuring a primary cell (PCELL) that belongs to a first timing advance (TA) group having a first TA group index and a first uplink timing advance;
configuring a secondary cell (SCELL) that belongs to a second TA group having a second TA group index and a second uplink timing advance;
transmitting a timing reference signal over the SCELL to a base station;
receiving a response message from the base station, wherein the response message carries the second uplink timing advance and thereby applying timing adjustment for uplink transmission over the SCELL; and
receiving a first TA timer value associated with the first TA group and a second TA timer value associated with the second TA group, wherein the first TA timer value and the second TA timer value are based on a cell coverage size of the PCELL and the SCELL respectively, and wherein the second TA timer has a larger value than the first TA timer if the SCELL has a smaller cell coverage size than the PCELL.

10. The method of claim 9, wherein the timing reference signal is a random access channel (RACH) preamble code, and wherein the response message is a random channel response (RAR) message.

11. The method of claim 10, further comprising:
receiving a first RACH assignment from the base station for the PCELL; and
receiving a second RACH assignment from the base station for the SCELL, wherein the UE is refrained from performing parallel RACH procedures over different cells at the same time.

12. The method of claim 10, wherein the UE monitors a physical downlink control channel (PDCCH) in UE-specific search space, and wherein the PDCCH is scrambled by a cell radio network temporary identifier (C-RNTI) of the UE over the PCELL or the SCELL.

13. The method of claim 10, wherein the UE monitors a physical downlink control channel (PDCCH) in common search space, and wherein the PDCCH is scrambled by a random access response radio network temporary identifier (RA-RNTI) over the SCELL.

14. The method of claim 10, wherein the UE monitors a physical downlink control channel (PDCCH) in common search space, and wherein the PDCCH is scrambled by a random access response radio network temporary identifier (RA-RNTI) with a carrier-specific offset over the PCELL.

15. The method of claim 9, wherein the timing reference signal is a random access channel (RACH) preamble code, wherein the timing advance is carried in a media access control (MAC) control element (CE), and wherein the UE monitors the MAC CE in UE-specific search space.

16. The method of claim 9, wherein the timing reference signal is a sounding reference signal (SRS), wherein the timing advance is carried in a media access control (MAC) control element (CE), and wherein the UE monitors the MAC CE in UE-specific search space.

* * * * *